US010586371B2

(12) United States Patent
Noh et al.

(10) Patent No.: US 10,586,371 B2
(45) Date of Patent: Mar. 10, 2020

(54) MOTION RETARGETING METHOD FOR CHARACTER ANIMATION AND APPARATUS THEREROF

(71) Applicant: KOREA ADVANCED INSTITUTE OF SCIENCE AND TECHNOLOGY, Daejeon (KR)

(72) Inventors: Jun Yong Noh, Daejeon (KR); Jae Won Song, Daejeon (KR); Roger Blanco Ribera, Daejeon (KR); Kyung Min Cho, Daejeon (KR); Mi Yu, Daejeon (KR); Byung Kuk Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/117,190

(22) Filed: Aug. 30, 2018

(65) Prior Publication Data

US 2019/0066351 A1 Feb. 28, 2019

(30) Foreign Application Priority Data

Aug. 31, 2017 (KR) .................. 10-2017-0111249

(51) Int. Cl.
*G06T 13/40* (2011.01)
*G06T 19/20* (2011.01)
*G06T 17/20* (2006.01)

(52) U.S. Cl.
CPC .............. *G06T 13/40* (2013.01); *G06T 17/20* (2013.01); *G06T 19/20* (2013.01); *G06T 2213/08* (2013.01)

(58) Field of Classification Search
CPC ......... G06T 13/40; G06T 13/20; G06T 17/20; G06T 2207/30204; G06T 13/00; G06T 2213/08; G06T 19/20
See application file for complete search history.

(56) References Cited

U.S. PATENT DOCUMENTS

| 8,797,328 B2 * | 8/2014 | Corazza | G06T 17/20 345/420 |
| 2012/0210262 A1 * | 8/2012 | Sheeler | G06T 13/20 715/765 |
| 2014/0219550 A1 * | 8/2014 | Popa | G06K 9/00342 382/154 |

OTHER PUBLICATIONS

Daniel Holden et al., "Learning an Inverse Rig Mapping for Character Animation", *14th ACM SIGGRAPH/Eurographics Symposium on Computer Animation*, (2015), ACM, pp. 165173. 1, 3, 6, 7, 9.
Fabian Hahn et al., "Sketch Abstractions for Character Posing", *14th ACM SIGGRAPH/Eurographics Symposium on Computer Animation*, (2015), ACM, pp. 185191. 3, 7.

* cited by examiner

*Primary Examiner* — Maurice L. McDowell, Jr.
*Assistant Examiner* — Donna J. Ricks (57) ABSTRACT

The present disclosure relates to a motion retargeting method and apparatus for character animation, and the method may include generating an intermediate object including at least one of a skeleton and a mesh based on a source motion and a target character, extracting keyframes of the intermediate object, constituting target rig parameters based on the extracted keyframes, and performing spacetime optimization on the target rig parameters to minimize a pose error between the intermediate object and the target character.

8 Claims, 7 Drawing Sheets

Algorithm 1: Iterative Rig Parameter Optimization

---

Input : Motion of intermediate object $M^I$,
  Keyframe list $\mathbf{k} = \{k_1, k_2, ..., k_{N_k}\}$,
  Target rig space parameters $\mathbf{c}$

Output: Motion of target character with rig space parameters
  $\bar{M}^c = \{P(\mathbf{c}(k_1)), ..., P(\mathbf{c}(k_{N_k}))\}$.

1 while *m_error>m_thr & iter<max_iter* do
2     Update keyframed motion of intermediate object $\bar{M}^I$
      while *k_err>k_thr & k_iter<max_k_iter* do
3         if *k_err>J_thr* then
4             - Update current rig Jacobian
5         end
6         - Optimize rig parameter differences $\Delta \mathbf{c}$
          - Update rig parameters $\mathbf{c} + \Delta \mathbf{c}$
          - Measure the *error* between $\bar{M}^I$ and $\bar{M}^c$
7     end
8     if *motion_error>motion_thr* then
9         - Compute error of each frame $\mathbf{e} = \{e_1, ..., e_{N_f}\}$
        - Find the maximum error frame $f_m = idx(max(\mathbf{e}))$
        - Add $f_m$ to the keyframe list
10    end
11 end

FIG. 8

MOTION RETARGETING METHOD FOR CHARACTER ANIMATION AND APPARATUS THEREROF

CROSS-REFERENCE TO RELATED APPLICATION

This application claims priority of Korean Patent Application No. 10-2017-0111249, filed on Aug. 31, 2017, in the KIPO (Korean Intellectual Property Office), the disclosure of which is incorporated herein entirely by reference.

BACKGROUND OF THE INVENTION

Field of the Invention

The present disclosure relates to a motion retargeting method and apparatus for character animation, and more particularly, to a motion retargeting method and apparatus for character animation to automatically generate a set of artist-friendly rig space parameters.

Description of the Related Art

The conventional motion retargeting method does not produce animation results that can be directly used in high quality applications. The user's manual intervention is additionally necessary with the need for editing, simple modification and style editing of the retargeting result or to simply change the artistic direction.

Most of motion editing methods and character animation researchers generally use skeletal representation techniques of characters, while animation makers primarily use animation rigs which are a separate control mechanism precisely designed by animators and specializers. In practice, generally, keyframe and performance-driven animation are each individually designed to have separate set of tools and pipelines.

Recently, there is an increasing interest in reducing this gap and developing artist-friendly character animation technologies. Generally, solutions have proposed faithfully reproducing motion sources with rig space parameters by treating the animation rigs as a black box of parameters without further consideration of the purpose or design behind different rig controls.

Nevertheless, the control rigs are constituted with a relative high number of degrees of freedom (DoFs) in design and including a plurality of controllers redundantly acting over the same body part, and provide an alternative manipulation method for processing different types of motions or simplifying the creation of common poses.

Additionally, generally some degree of dependency exists between parameters and pose-dependent behavior. Estimating a suitable and efficient set of parameters is a difficult problem when considering a variety of parameter types (including discrete, continuous, range-constrained and completely free).

Blindly utilizing all of available parameters to achieve a designated target pose may result in a few nearly redundant controls activated together, as a result, making the editing task very complex.

Accordingly, careful consideration of the animator's workflow may not only reduce the inherent ambiguity of rig space parameters in a generally under-constrained problem, but also generate a set of rig space parameters that are closer to those produced by artists in the traditional keyframing task, as a result, making the manual manipulation easy.

Figure 1:
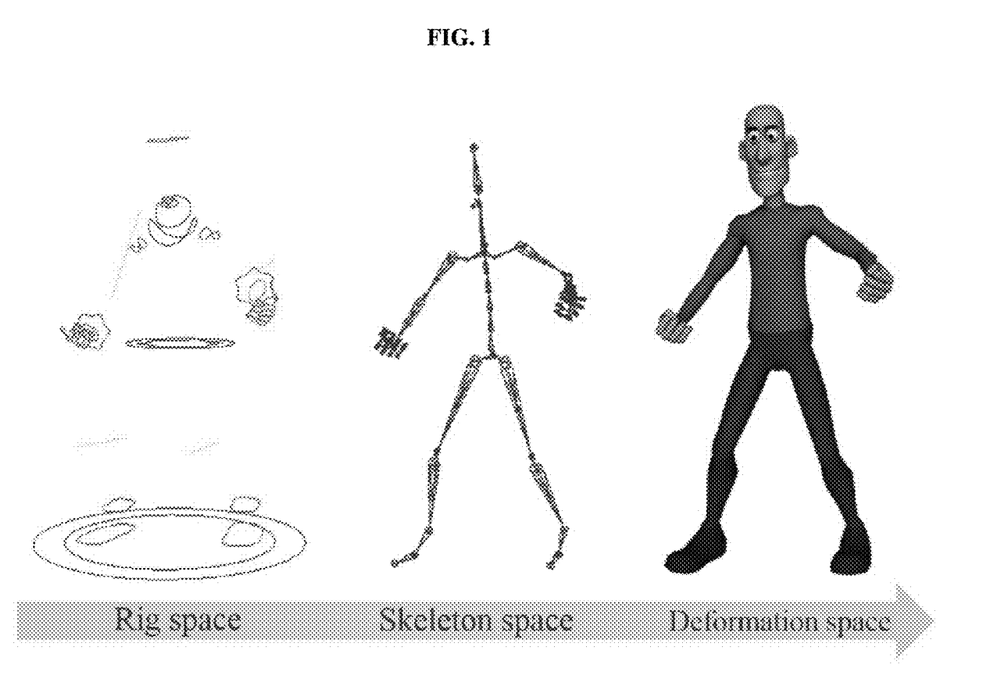
FIG. 1 is a diagram showing three layers that constitute a general production rig.

FIG. 1 is a diagram showing three layers that constitute a general production rig.

The rig space exposes different DoFs with which an artist can interact to manipulate a character. Most commonly, different rig space parameters are directly represented on the viewport with simple objects that can be selected and manipulated by a user. The more abstract parameters may be accessed via panels and editors. In the skeleton space, the character's pose is determined through rigid body transformations applied to hierarchical skeleton. Finally, the deformation space deforms the character body, taking a correlation between skeleton and mesh vertices into account.

Controllers may be classified as below according to the functionality of the production rig.

FK and IK controllers constitute the basic type of control on a body rig. This type of controller usually represented with simple objects such as circles or cubes facilitates the selection of specific joints and provides direct linear control over the rotation of each joint or target position of the end-effector of a chain of joints.

Set-driven controllers specify a relationship between a pose with only skeleton and a single numeric parameter. To facilitate the creation of complex poses that frequently occur in animation, they are generally used to provide a user-defined form of higher level control. An exact relationship is defined by the rigger and is usually transparent to the animator.

Mesh deformers control over the deformation layer by acting directly on the character mesh, instead of the skeletal structure. In particular, they can be set to control the sliding of the skin or bulging of muscles. In general, a particular type of mesh deformer called blendshapes represents one of main approaches of facial animation, and it works by deforming the face into specific target expressions.

Accordingly, the present disclosure proposes a novel motion retargeting method aimed at automatically generating a set of rig space parameters that is similar to those manually developed by artists to keyframe and edit a given motion more quickly, with the characteristics of versatility, rig ambiguity, sparsity and user control easiness.

The present disclosure proposes the use of an intermediate object to transfer motions from various types of inputs (e.g., skeletal motion, mesh animation or 3D marker movements estimated from motion capture processes) to various target rigged characters, in order to ensure versatility. The intermediate object provides intuitive and standardized error measurement for retargeting.

Figure 2:
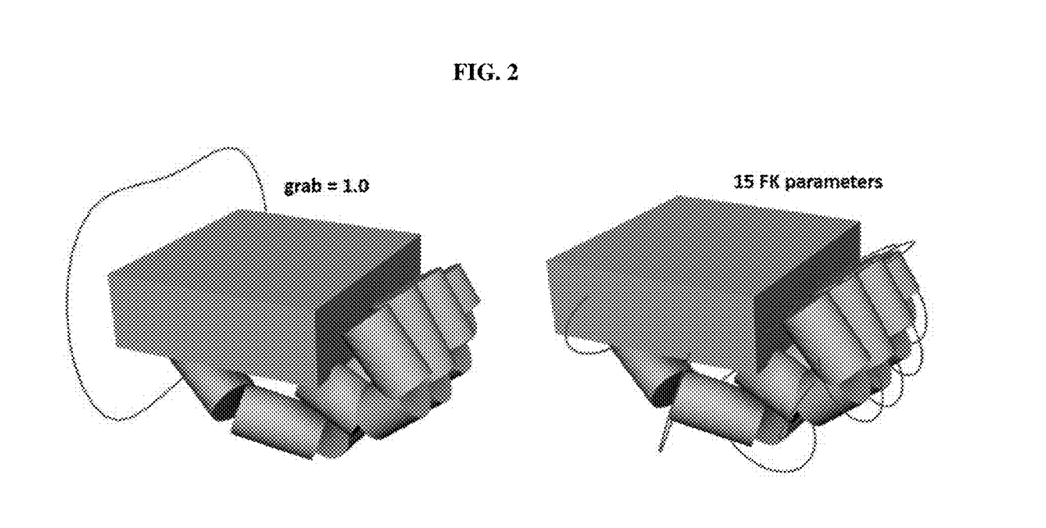
FIG. 2 is a diagram illustrating the reason why it is necessary to ensure rig ambiguity.

FIG. 2 is a diagram illustrating the reason why it is necessary to ensure rig ambiguity, and with reference to FIG. 2, it can be seen that the set-driven controller (left) is more efficient in the generation of a hand grabbing motion, and the FK controller (right) is better suited to animate a finger tapping motion. Accordingly, the present disclosure provides the most efficient solution among redundant rig parameters to ensure rig ambiguity, making the editing process easy.

An artist-friendly retargeting process needs to keep the balance between fidelity to the source motion and ease of editing. When significant modifications are envisaged, a large number of activated parameters hinder the editing process. Accordingly, the present disclosure incorporates sparsity that induces regularizer into the rig space optimization process to minimize the number of activated parameters, thereby ensuring sparsity. Additionally, because densely sampled keyframes severely hinder the editing of timing and propagation in time of specific pose changes, it is necessary to perform keyframe extraction before the optimization step.

The optimized rig space parameters provide the most suitable parameters for input motion, but may not necessarily suit the animator's editing intention. Accordingly, the present disclosure allows the animator to specify a suitable type of controller in a simple manner if desired, thereby ensuring the user control easiness.

SUMMARY OF THE INVENTION

Accordingly, to solve the above-described problem, the present disclosure is directed to providing a motion retargeting method and apparatus for character animation to automatically generate a set of artist-friendly rig space parameters.

Additionally, the present disclosure proposes a new type of motion retargeting method for character animation with versatility, rig ambiguity, sparsity and user control easiness.

The object of the present disclosure is not limited to the above-mentioned objects and another object not mentioned herein will be clearly understood by those having ordinary skill in the art from the following description.

As the means for achieving the above-described object, according to an embodiment of the present disclosure, there is provided a motion retargeting method for character animation including generating an intermediate object including at least one of a skeleton and a mesh based on a source motion and a target character, extracting keyframes of the intermediate object, constituting target rig parameters based on the extracted keyframes, and performing spacetime optimization on the target rig parameters to minimize a pose error between the intermediate object and the target character.

The source motion may be a skeletal motion, a mesh animation, 3D marker data, or a combination of at least one of the skeletal motions, the mesh animation and the 3D marker data.

The step for generating the intermediate object may include generating an intermediate skeleton having the same proportion and structure as the target character, and retargeting the skeletal motion of the source motion to the intermediate skeleton to obtain a skeletal motion of the intermediate object.

The step for generating the intermediate object may include, when a plurality of corresponding points between the source motion and the target character is selected by a user, generating a source mesh structure based on the corresponding points of the source motion, generating an intermediate mesh that has the same structure as the source mesh structure and is formed with the corresponding points of the target character, and transferring deformation gradients from the source mesh structure to the intermediate mesh for each frame to obtain an intermediate mesh animation.

Additionally, the step for extracting the keyframes may include measuring multiscale motion saliency of the intermediate object, and selecting only frames with the multiscale motion saliency that is equal to or higher than a preset value as the keyframes.

The step for minimizing the error between the intermediate object and the target character may include constituting target rig parameters through skeletal rig parameters and deformation rig parameters, and determining a pose of the target character based on the target rig parameters, and estimating optimal skeletal rig parameters to minimize a skeleton error between the intermediate object and the target character, and estimating optimal deformation rig parameters using the estimated skeletal rig parameters to minimize a mesh error between the intermediate object and the target character.

The step for estimating may include optimizing the skeletal rig parameters and the deformation rig parameters through an energy functional equation of $$\text{"min } E(\overline{M}^I, \overline{M}^C) = \sum_{t=1}^{N_k} E(p^I(t), p(c(t)))\text{"},$$

in which the $$E(p^I(t) \cdot p(c(t)))$$

is calculated according to the equation of $$\text{"}E_p(p^I \cdot p(c)) + \lambda_{sp} E_{sp}(c) + \lambda_{ac} E_{ac}(c)\text{"},$$

the $\overline{M}^I$ is the intermediate object, the $\overline{M}^C$ is the target character, the $p^I(t)$ and $p^I$ is the pose of the intermediate object, the $p(c(t))$ and $p(c)$ are the target character pose, the $c(t)$ is the rig space parameters, the $E_p(p^I \cdot p(c))$ is pose difference energy between the intermediate object pose and the target character, the $E_{sp}$ is sparse regularization energy, the $E_{ac}$ is temporal smoothness, the $\lambda_{sp}$ is a weight of the $E_{sp}$, and the $\lambda_{ac}$ is a weight of the $E_{ac}$.

As the means for achieving the above-described object, according to another embodiment of the present disclosure, there is provided a motion retargeting apparatus for character animation including an intermediate object generation unit configured to generate an intermediate object including at least one of a skeleton and a mesh based on a source motion and a target character, a keyframe extraction unit configured to extract keyframes of the intermediate object, and a target rig parameter optimization unit configured to constitute target rig parameters based on the extracted keyframes, and perform spacetime optimization on the target rig parameters to minimize a pose error between the intermediate object and the target character.

The present disclosure may robustly estimate user interface parameters of an arbitrary rig without prior user-given information on the rig, and reproduce a given motion more accurately.

In addition, the optimization framework of the present disclosure is based on intermediate object representation based on 3D transformations of skeleton and a mesh structure having corresponding points between source and target characters, and this framework improves versatility and efficiency and minimizes a pose error. Furthermore, an optimization scheme is constructed while considering different aspects of the animator's workflow, which facilitates the subsequent data editing.

The present disclosure can be seamlessly incorporated into the existing animation production pipeline, and can maximize productivity in the animation production process through the fine-tuning function for a desired rig space solution by controlling the results.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 3:
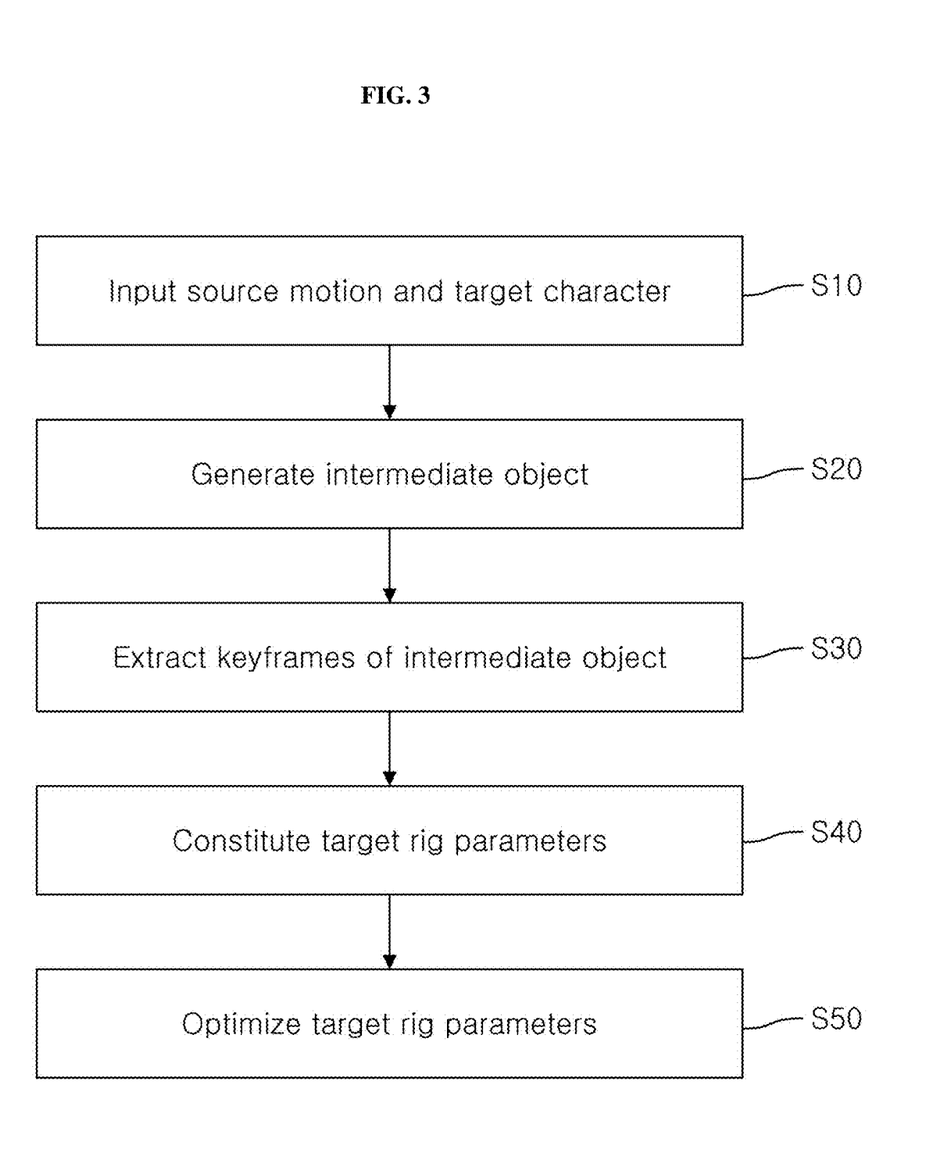
FIG. 3 is a diagram schematically illustrating a motion retargeting method for character animation according to an embodiment of the present disclosure.

As shown in FIG. 3, the present disclosure largely includes the steps of receiving inputs of a source motion and a target character (S10), generating an intermediate object including at least one of a skeleton and a mesh based on the source motion and the target character (S20), extracting keyframes of the intermediate object (S30), constituting target rig parameters based on the extracted keyframes (S40), and performing spacetime optimization on the target rig parameters to minimize a pose error between the intermediate object and the target character (S50).

The present disclosure relates to a motion retargeting method that can operate in the context of animation production pipeline in which a 3D rigged character is created in the existing commercial software package (e.g., Maya).

The present disclosure uses the source motion and the rigged target character as inputs to the system. In this instance, the source motion may be a skeletal motion, a mesh animation, 3D marker data, or their combination. Additionally, the target rig is considered as a black box to eliminate the need for prior information associated with a correlation between the rig parameters and the target character pose.

The present disclosure separately generates an intermediate object on which the source motion will be reflected, and using this, finds optimal rig space parameters of the character that can reproduce the source motion most faithfully.

The intermediate object is composed of a skeleton and a mesh, and the intermediate skeleton has the same structure and proportion as the skeleton of the target character. The intermediate mesh may be generated by requesting the user to select a small number of corresponding points on both the source and target characters.

Additionally, deformations of the source motion with respect to a reference frame are transferred to the intermediate mesh. However, if necessary, deformations of the source motion may be reflected on only one of the components of the intermediate object. For example, when an input mesh animation with no skeleton is given, motion deformations may be reflected on the intermediate mesh only except the intermediate skeleton.

Additionally, keyframes are extracted from the intermediate object reflecting source motion deformations. In this case, the computation time of the rig parameter optimization step is dramatically reduced, and time-sparse rig parameter results that make all subsequent editing easier are provided.

Finally, spacetime optimization is performed on the target rig parameters to minimize an error between the intermediate object and the target character. In many cases, the conventional naive optimization method of rig space parameters needs to additionally execute a sub-optimal solution due to the highly redundant nature of production rigs, but the method of the present disclosure produces a sparse and temporally smooth solution for various types of input motions. Additionally, if necessary, artists are allowed to annotate on the timeline which specify favorable parameters, so that the optimized rig parameters reflect the artists' animation preference better.

Subsequently, the motion retargeting method for character animation according to an embodiment of the present disclosure will be described in more detail with reference to FIGS. 4 to 6.

In S10, when inputs of a source motion and a target character are received, in S20, an intermediate object including at least one of a skeleton and a mesh is generated, and the intermediate object is deformed according to the source motion.

For reference, for motion reproduction, a common standard is necessary to determine if the retargeting results accurately reproduce the original source motion. However, the source motion may have various types including skeletons, mesh animations and captured 3D markers, and thus it is difficult to perform this comparison task. Accordingly, the present disclosure proposes the use of an intermediate object to represent pose differences between source and target that are different from each other more stably.

As previously described, the intermediate object has a skeleton and a mesh structure to handle the skeletal and mesh deformation components of a target character rig.

At time t, a pose of the intermediate object $P^I$ is represented as $P^I(t)=(P^I_S(t), P^I_f(t))$ by the skeletal parameter $P^I_S$ and the mesh parameter $P^I_f$, and a skeletal motion of the intermediate object is a temporal sequence of the intermediate pose $M(p^I(t))=(P^I_S(t0), \ldots, P^I_S((N_t)))$ with $N_t$ being the number of existing frames.

Figure 4:
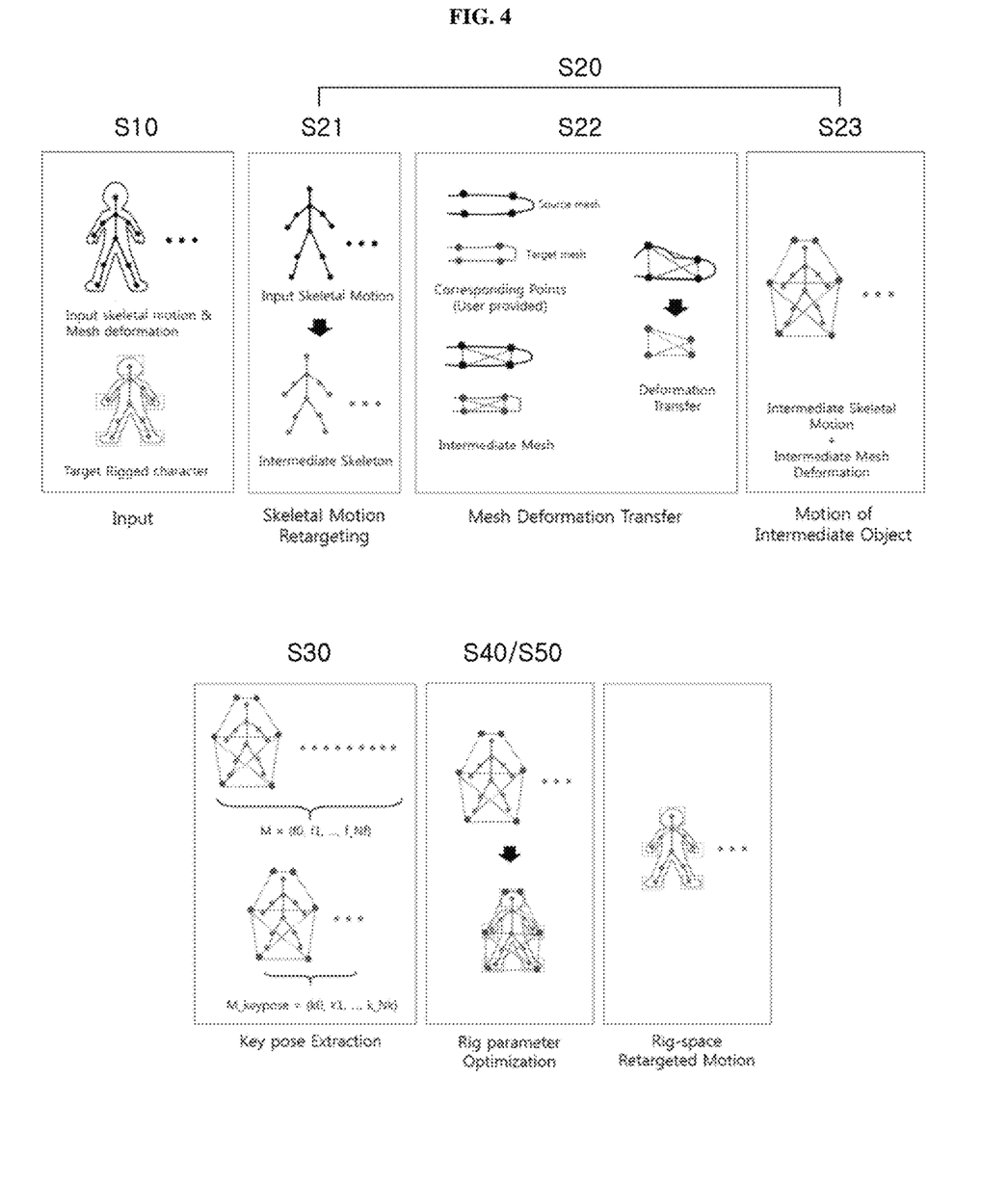
FIGS. 4 to 7 are diagrams detailing a motion retargeting method for character animation according to an embodiment of the present disclosure.

Accordingly, in S21, an intermediate skeleton having the same proportion and structure as the target character is generated, and then as shown in FIG. 4, the source motion is retargeted to the intermediate skeleton to obtain the skeletal motion of the intermediate object. However, S21 is performed only when both the source and target characters have a skeleton structure, and otherwise, S21 may be omitted.

The pose of the intermediate skeleton is represented as $$P^I_s(t) = (s^I_1(t), \ldots, S^I_{N_j}(t)) \in R^{6 \times N_j},$$

and $s_i$ denotes individual parameters of $N_j$ joint of the skeleton. Among many skeletal representation methods, the present disclosure uses a 6-dimensional vector in the Lie algebra that represents rigid transformation of Special Euclidean Group SE(3) group by matrix exponentiation. With Lie group representation, optimization of the present disclosure can be performed on the linearized manifold, and in this case, as opposed to Euclidean representations, an optimal solution can be obtained through accurate and efficient computations of rotational and positional errors.

Figure 5:
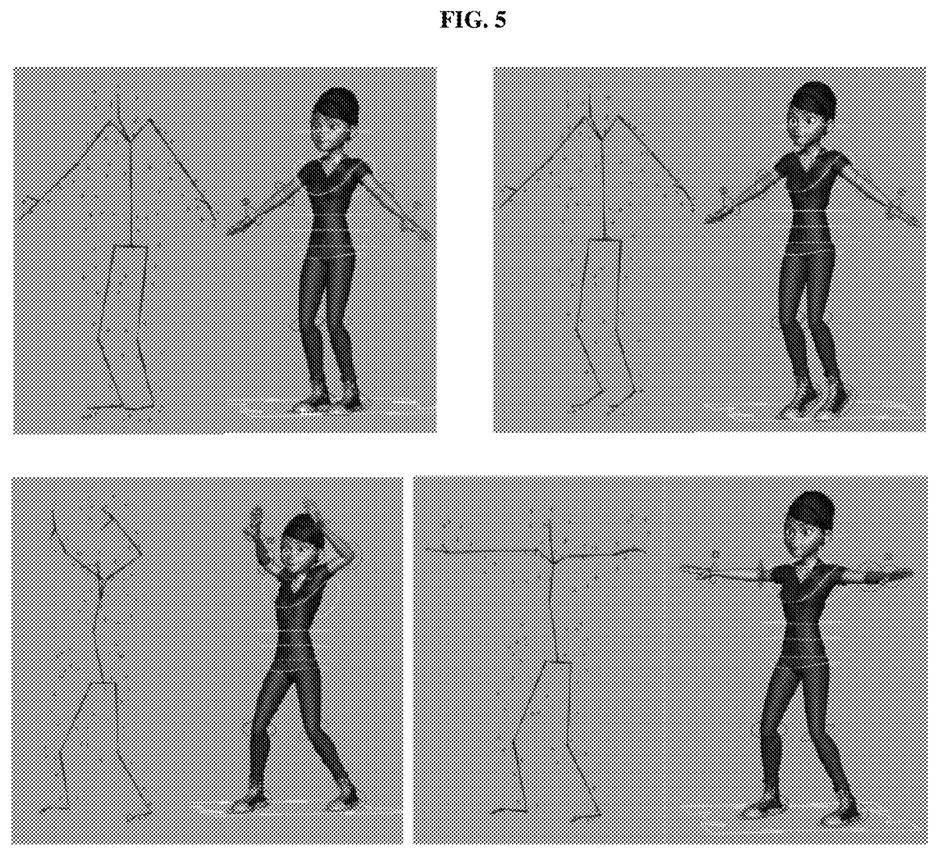
Figure 6:
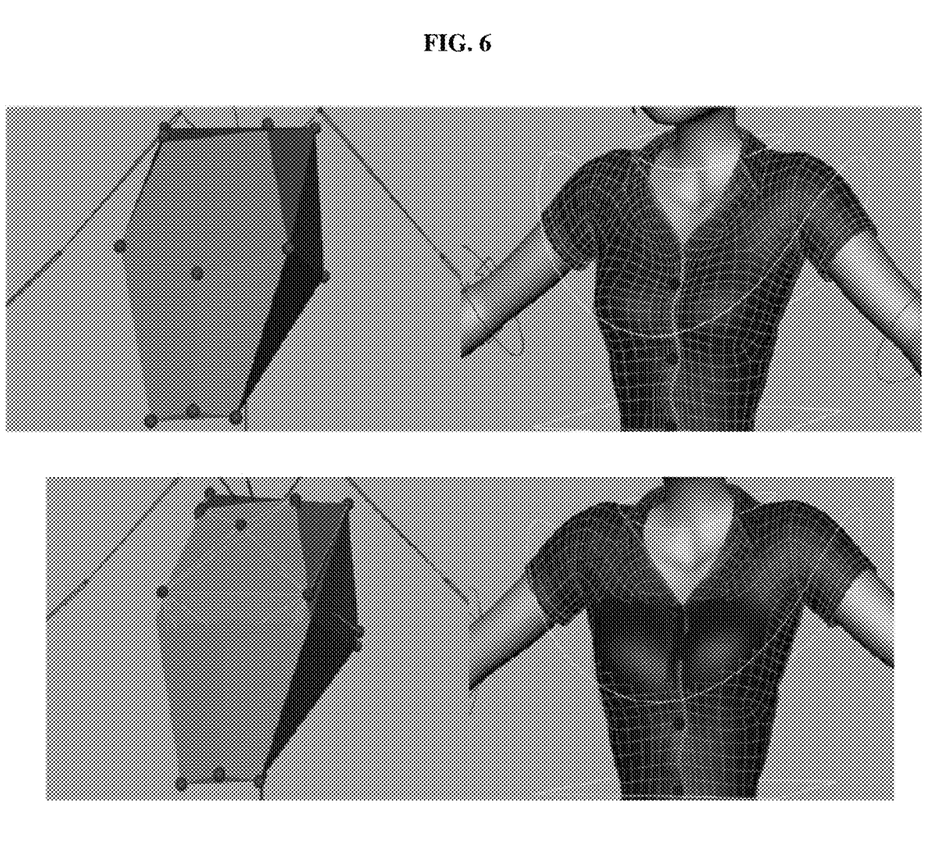

Additionally, in S22, an intermediate mesh for a non-skeletal input motion and the deformation rig parameters of the target character is generated, and then deformations of the source motion are reflected on the intermediate mesh as shown in FIG. 5. In FIG. 5, the blue mesh indicates an initial mesh of the intermediate object, and the red mesh indicates deformation of the intermediate mesh transferred to the target character.

First, the user is allowed to select $N_v$ source points $$(v^s = v^s_1, \ldots, v^s_{N_v})$$

and $N_v$ target points $$(v^I = v^I_1, \ldots, v^I_{N_v})$$

corresponding to each other, on each mesh surface of the source motion and the target character.

Additionally, Delaunay tetrahedralization is performed on the source points $v^s$ selected by the user to generate a source mesh structure $f^s=(v^s, e^s)$ corresponding to the source points $v^s$, and generate an intermediate mesh $f^I=(v^I, e^I)$ that has the same mesh structure as $f^s$ and is formed with $v^I$. In this instance, v is points that make up the mesh, and e is edges that make up the mesh.

The first frame is set to the initial mesh $f^s(t_1)$ and $f^I(t_1)$, and $$M(f^s) = (f^s(t_1), \ldots, f^s(t_{N_f}))$$

denotes the temporal deformation of the input mesh. Additionally, deformation gradients from $f^s$ to $f^I$ at each frame are transferred to obtain an intermediate mesh animation $$M(f^I) = (f^I(t_1), \ldots, (t_{N_f})).$$

Deformations of the target character are estimated by connecting the points in the intermediate mesh structure. To estimate the deformation rig parameters, the target character is registered to the intermediate mesh $f^I$, and the pose of the intermediate mesh $f^I$ is represented as $$p^I_f = (v^I_1, \ldots, v^I_{N_v}) \in R^{3 \times N_v}.$$

using 3D vertices of the intermediate mesh $f^I$.

Additionally, in S23, a motion of the intermediate object is generated based on the intermediate skeleton and the intermediate mesh deformations.

Subsequently, in S30, multiscale motion saliency is measured for each of $N_f$ frames of the intermediate object, and only $N_k$ frames with multiscale motion saliency that is equal to or higher than a preset value are selected as keyframes. That is, the intermediate object motion $$M(p^I) = p^I(f_1), p^I(f_2), \ldots, p^I(f_{N_f})$$

is reduced to $$\overline{M}(P^I) = p^I(k_1), p^I(k_2), \ldots, p^I(k_{N_k})$$

based on multiscale motion saliency. In this instance, $f_i$ is $i^{th}$ frame of all the frames, and $k_i$ is $i^{th}$ frame of the keyframe.

Generally, source animations such as motion capture data are densely sampled from 30 Hz to 120 Hz, and thus optimization of all motion frames is inefficient. Accordingly, the present disclosure solves this problem by optimizing only a set of keyframes that can represent the original motion sufficiently well. In this case, the number of frames and the computation time requiring animators to work in the subsequent editing process of target motions is significantly reduced.

As an alternative to the method, there is a method of performing graph simplification by post-processing the rig parameter optimization results to obtain the minimum number of samples for each rig parameter, but this method has a problem that the location at which the keyframes are placed may change for each rig space parameter, making the animator's task complex.

In S40, the target character pose $p^T(c(t))$ is determined by specifying different rig space parameters $$c = (c1, c2, \ldots, c_{N_c}) \in R^{N_c}.$$

In this instance, $c_i$ denotes a scalar value of one of $N_c$ individual rig parameters.

The present disclosure constitutes the target rig space parameters c through the skeletal rig parameters $c_s$ and the deformation rig parameters $c_f$ and based on this, determines the target character pose $p^T(c(t))$.

In S50, spacetime optimization is performed on the target rig parameters to minimize a pose error between the intermediate object and the target character.

The present disclosure performs mesh deformation optimization after skeletal pose optimization because the skeletal rig parameters $c_s$ may also affect the deformations of the target mesh. That is, optimal skeletal rig parameters $c_s$ are estimated to minimize a skeleton error between the intermediate object skeleton $M(p^I_s)$ and the target character skeleton $M(p^T_s)$ first, and then the values of the optimal deformation rig parameters $c_f$ are estimated using the estimated skeletal rig parameters $c_s$ to minimize an error between the intermediate object mesh $M(p^I_f)$ and the target object mesh $M(p^T_f)$.

Subsequently, an optimization method of the skeletal rig parameters cs and the deformation rig parameters cf will be described in more detail below. However, because the same error measurement standard is used to estimate the skeletal and deformation parameters, the subscript is omitted and only c and p are indicated for convenience of description.

The present disclosure formulates retargeting as a problem with minimization of a pose error between the intermediate object and the target character based on the rig space parameters as in the following Equation 1.

$$\min E(\overline{M}^I, \overline{M}^C) \quad \text{[Equation 1]}$$

$$\overline{M}^C = \{p(c(k_1)), p(c(k_2)), \ldots, p(c(t)), \ldots, p(c(N_k))\} \quad \text{[Equation 2]}$$

In this instance, the sequence $c*(t)|k_1 \leq k \leq^k N_k$ of rig space parameter optimization for all keyframes is the output of the system. A method for optimizing the rig space parameters to reproduce the source motion as closely as possible is the same as below. When the intermediate object motion is $M^I$, an objective function to be minimized is represented by the following Equation 3.

$$\min E(\overline{M}^I, \overline{M}^C) = \sum_{t=1}^{N_k} E(p^I(t), p(c(t))) \quad \text{[Equation 3]}$$

In this instance, the per-frame solution (c(t)=c) for the source pose $(p^s(t)=p^s)$ is obtained through energy minimization as in Equation 4.

$$E(p^I, p(c)) = E_p(p^I, p(c)) + \lambda_{sp} E_{sp}(c) + \lambda_{ac} E_{ac}(c) \quad \text{[Equation 4]}$$

In this instance, the weights $\lambda_{sp}$ and $\lambda_{ac}$ are a value for determining the relative importance of each term, and for example, $\lambda_{ac}$ may be 0.1, and $\lambda_{sp}$ may be 0.01 $\text{vol}_c$. $\text{vol}_c$ denotes the volume of the bounding box of the target rigged character.

$E_p$ denotes pose difference, $E_{sp}$ denotes sparse regularization, $E_{ac}$ denotes temporal smoothness, and these terms are defined by the following Equations 5, 7, and 8.

First, $E_p$ is pose difference energy between the intermediate object and the target rigged character at each keyframe, and may be defined by Equation 5. The present disclosure minimizes $E_p$ through the optimization process.

$$E_p(p^I, p(c)) = \|p^I - p(c)\|^2 \quad \text{[Equation 5]}$$

In this instance, p(c) does not need to be defined because a relationship between p and c is considered as a black box. Accordingly, the current state of the rig may be identified using the existing linear approximation method, and p(c) at frame t may be approximated by the following Equation 6.

$$p(c) \approx p(c(t)) + J_{it} W(c(t))(c - c(t)) \quad \text{[Equation 6]}$$

In this instance, J denotes Jacobian $$\frac{\partial p}{\partial c}$$

of the target character rig representing the iteration step during the optimization process, and W is user-supplied constraint weight matrix of the rig space parameter c. The linear rig model of the present disclosure is different from the conventional linear rig model because of including the matrix W and the updated Jacobian $J_{it}$ during optimization. W is a diagonal binary matrix that can be used by the artist to specify the parameters to consider or disregard during the optimization process, but when the artist specifies a set of controllers to use, W is set as the identity matrix by default. This approach of the present disclosure allows accurate convergence of rig space parameters.

Next, $E_{sp}$ is sparse regularization energy. Energy for the pose difference is minimized by the linear rig approximation model, but redundant solutions may exist for under-constrained optimization because the same pose can be achieved with different combinations of rig space parameters.

Accordingly, regularization energy $E_{sp}$ is used to induce sparsity in the solution space by effectively disambiguating redundant configuration and favoring compact solutions. In particular, the present disclosure adopts L1 regularizer that favors solutions with the fewest changed rig space parameters.

$$E_{sp} = \|\Delta c(t)\|_1 \quad \text{[Equation 7]}$$

To reduce the number of parameters that need attention, it is necessary to minimize a change $\Delta c$ of parameter from the current state, and thus the present disclosure obtains parameter sparsity with $\Delta c$ instead of c. When only one body part moves in the source motion, only the rig space parameters associated with the moving part should change. Generating sparse activation of the rig controllers reflects the animator's workflow, and thus the artist tends to prefer working with a sparse set of controls instead of being inundated by a large number of control parameters with small values.

Last, $E_{ac}$ is temporal smoothness. The acceleration energy is minimized at time t according to Equation 8 so that the rig space parameter values change smoothly across adjacent frames, to ensure temporal smoothness of the generated rig parameters and prevent unexpected popping artifacts from appearing in the resulting estimated motion.

$$E_{ac} = \frac{1}{2} \| \Delta c(t-1) - 2\Delta c(t) + \Delta c(t+1) \|^2 \quad \text{[Equation 8]}$$

Accordingly, the energy of Equation 4 as previously described may be minimized by solving Equation 9.

$$\mathcal{W}^T \mathcal{J}_{it}^T \mathcal{J}_{it} \mathcal{W} + \lambda_{sp} \mathcal{L} + \lambda_{ac} \mathcal{A}^T \mathcal{A}) \Delta \mathcal{C} =$$
$$\mathcal{W}^T \mathcal{J}_{it}^T \Delta \mathcal{P} \quad \text{[Equation 9]}$$

In this instance, $\Delta C = (\Delta c(1)^\tau, \ldots \Delta c(N_k)^\tau)^\tau$, $\Delta \mathcal{P} = (\Delta p(1)^\tau, \ldots \Delta p(N_k)^\tau)^\tau$, $\mathcal{J}$, $\mathcal{W}$, $\mathcal{L}$ are block diagonal matrices corresponding to keyframes $(1, \ldots, n_k)$ of J, W and L respectively, $\mathcal{A}$ is the acceleration matrix for all keyframes, and the form of each matrix may be represented by Equation 10 to 13. In this instance, L is the L1 regularization energy matrix for minimizing rig variables and this may be represented by the iterated ridge regression method as described below. I is the identity matrix.

$$\mathcal{J} = \begin{bmatrix} J(t_1) & \cdots & 0 \\ \vdots & \ddots & \vdots \\ 0 & \cdots & J(t_n) \end{bmatrix} \quad \text{[Equation 10]}$$

$$\mathcal{L} = \begin{bmatrix} L(t_1) & \cdots & 0 \\ \vdots & \ddots & \vdots \\ 0 & \cdots & L(t_n) \end{bmatrix} \quad \text{[Equation 11]}$$

$$\mathcal{W} = \begin{bmatrix} W(t_1) & \cdots & 0 \\ \vdots & \ddots & \vdots \\ 0 & \cdots & W(t_n) \end{bmatrix} \quad \text{[Equation 12]}$$

$$\mathcal{A} = \begin{bmatrix} 0 & \cdots & & & 0 \\ I & -2I & I & & \\ \vdots & & \ddots & & \vdots \\ & & I & -2I & I \\ 0 & & & & 0 \end{bmatrix} \quad \text{[Equation 13]}$$

In this instance, L is the matrix for L1 regularization energy, and A is the matrix for acceleration energy. Because the L1 norm in Equation 7 is non-differentiable, the present disclosure uses the iterated ridge regression method with an expression of the L1 norm.

$$L = \text{diag}(|\Delta c_{it-1}|)^{-1} \quad \text{[Equation 14]}$$

In this instance, diag(x) is a diagonal matrix with the diagonal vector x. Equation 9 is repeated until a keyframe motion error k_err is smaller than a keyframe motion error threshold k_thr, or is iteratively solved until iteration k_iter reaches the maximum number of iterations max_k_iter. After computation of the keyframes is iteratively performed, a motion error m_error is computed. When the m_error is greater than the overall motion error threshold m_thr, a new frame $f_m$ is added to the keyframe list. In this instance, $f_m$ has the maximum pose error among all frames.

Figure 7:
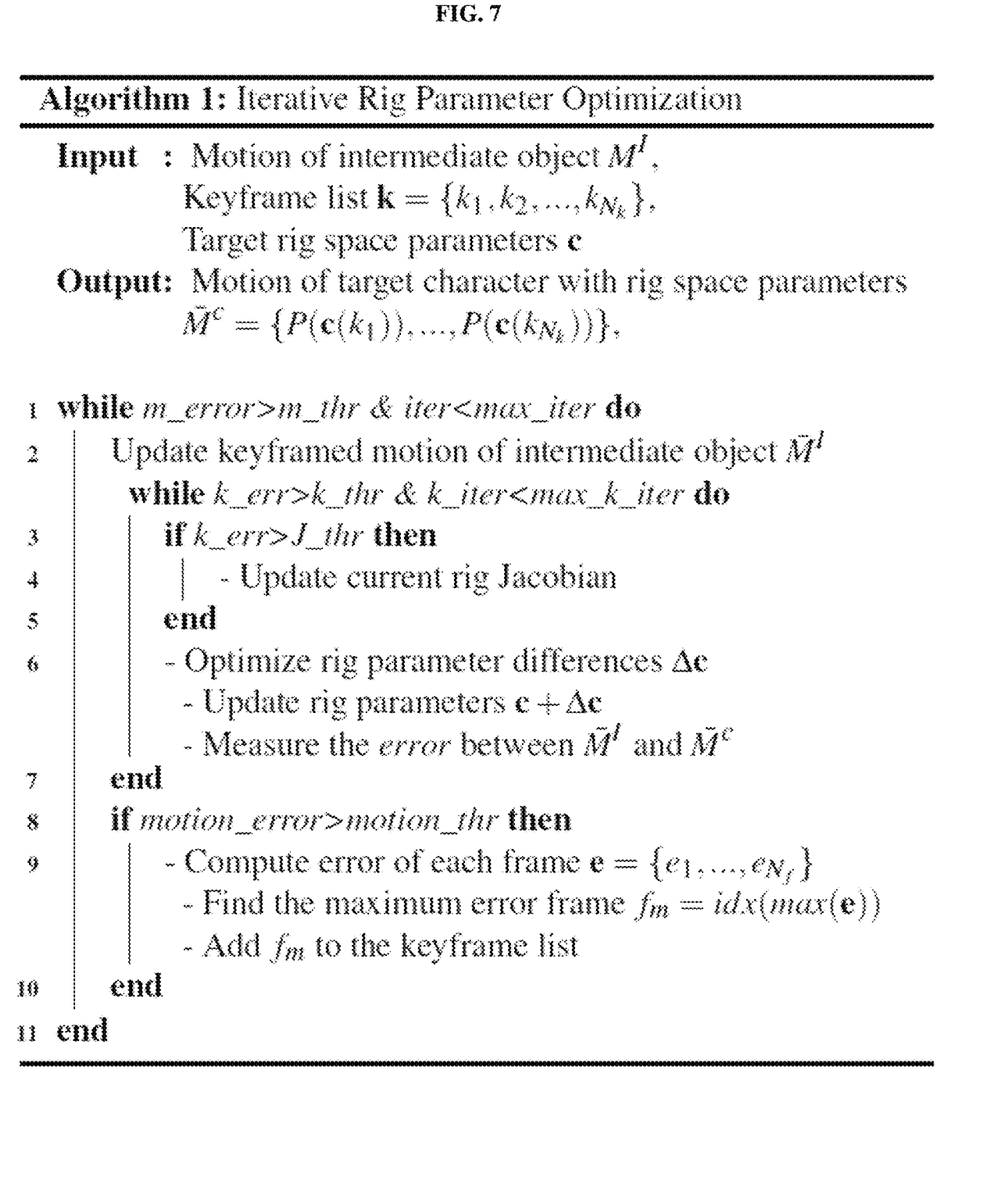

This step minimizes the possibility that the previously obtained keyframe list may be insufficient to reproduce the intermediate motion normally in the target rig space. Iteration for optimization restarts based on the updated keyframe list. For example, max_iter and max_k_iter may be set to 5 and 10, k_err and m_error may be set to 0.01 $\text{vol}_c$ and 0.05 $\text{vol}_c$, and the iterative optimization process may be summarized in algorithm 1 depicted in FIG. 7.

To solve Equation 9 using the Newton-Raphson scheme, Jacobian J needs to be updated. When the rig is considered as a black box, a general approach is to compute Jacobian by measuring the finite differences of the rig space parameters and the resulting skeletal pose. When the existing 3D software package such as Maya is used, the corresponding process requires a large number of internal node interactions, inevitably causing the computational cost to greatly increase. To solve this problem, the rig model is approximated as a linear model and Jacobian computed at the beginning of optimization for each frame is reused, and this method is valid as long as the target pose and the initial pose for optimization are close enough. However, when a target pose having a large change value from the initial pose occurs, the method may not converge by using the initially estimated Jacobian. Accordingly, the present disclosure only partially adopts the idea of reusing the initial Jacobian again to reduce the computation time. In particular, the Jacobian is updated each iteration until the optimization results reach a specific error threshold J_thr of the solution. It is safe to approximate the rig as a linear model by fixing the Jacobian to a currently estimated value, and for example, the value of J_thr may be set to 50k_thr. To further increase the efficiency of Jacobian computation, only necessary matrix components rather than the entire Jacobian matrix may be updated. For example, when the skeletal pose $p_k$ is far from the target pose, a set of related rig space parameters affecting $p_k$ may be found and only corresponding Jacobian components may be updated. The related rig space parameters may be easily found using the finite difference of the rig space parameters and the resulting skeletal pose in each step.

Figure 8:
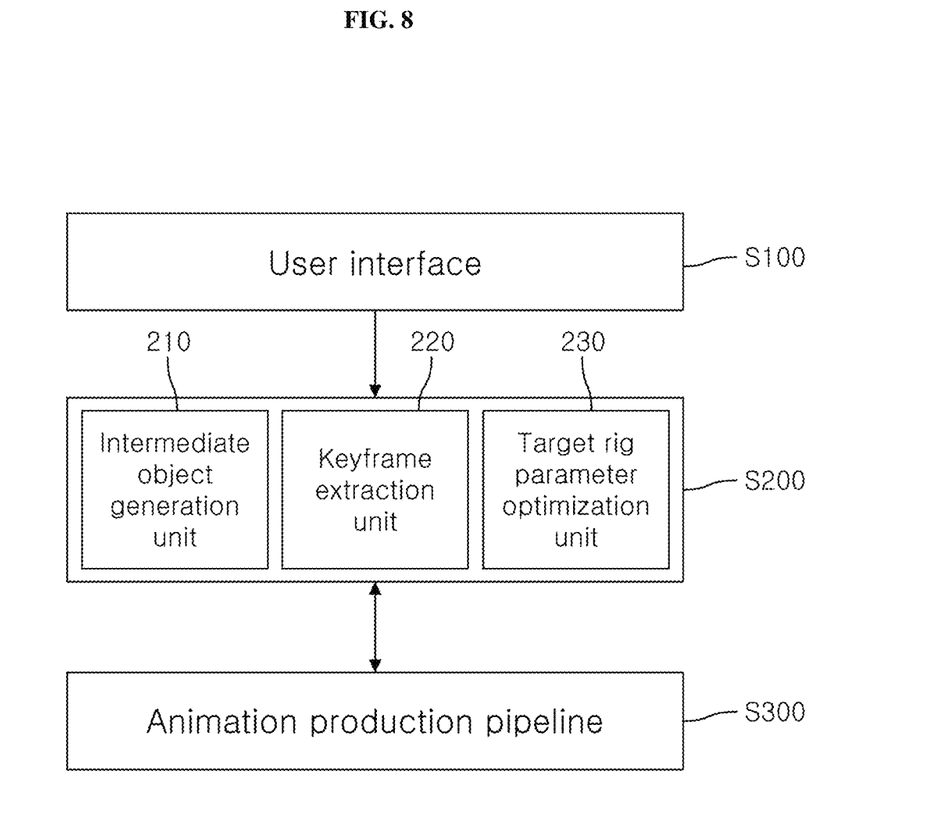
FIG. 8 is a diagram illustrating a motion retargeting apparatus for character animation according to an embodiment of the present disclosure.

FIG. 8 is a diagram illustrating a motion retargeting apparatus for character animation according to an embodiment of the present disclosure.

As shown in FIG. 8, the apparatus of the present disclosure includes a user interface 100 and a retargeting processor 200, and has a structure that may be incorporated into an animation production pipeline 300.

The user interface 100 obtains and supplies various pieces of data for a motion retargeting task, or provides the motion retargeting task results visually and audibly.

The retargeting processor 200 may include an intermediate object generation unit 210 which generates an intermediate object including at least one of a skeleton and a mesh based on a source motion and a target character supplied from the user interface 100, a keyframe extraction unit 220 which extracts keyframes of the intermediate object based on multiscale motion saliency, and a target rig parameter optimization unit 230 which constitutes target rig parameters based on the extracted keyframes and performs spacetime optimization on the target rig parameters to minimize a pose error between the intermediate object and the target character.

That is, the motion retargeting apparatus of the present disclosure may robustly estimate user interface parameters of an arbitrary rig without any prior user-given information on the rig, and reproduce a given motion more accurately.

Additionally, the optimization framework of the present disclosure is based on intermediate object representation including at least one of a skeleton and a mesh, and this framework improves versatility and efficiency and minimizes a pose error. Furthermore, an optimization scheme is constructed while considering different aspects of the animator's workflow, which facilitates the subsequent data editing.

Additionally, the apparatus of the present disclosure can be seamlessly incorporated into the existing animation production pipeline 300, and can control the results to fine tune a desired rig space solution, thereby maximizing productivity in the animation production process.

The motion retargeting apparatus of the present disclosure configured as described above may be implemented as a hardware device, and in some cases, may be implemented in a manner of being embedded in the animation production pipeline 300 in the form of an embedded device and a software program.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A motion retargeting method of a motion retargeting apparatus for character animation comprising:
    generating an intermediate object including at least one of a skeleton and a mesh based on a source motion and a target character;
    extracting keyframes of the intermediate object;
    constituting target rig parameters based on the extracted keyframes; and
    performing spacetime optimization on the target rig parameters to minimize a pose error between the intermediate object and the target character,
    wherein the generating the intermediate object comprises:
        when a plurality of corresponding points between the source motion and the target character are selected by a user, generating a source mesh structure based on the corresponding points of the source motion;
        generating an intermediate mesh that has the same structure as the source mesh structure and is formed with the corresponding points of the target character; and
        transferring deformation gradients from the source mesh structure to the intermediate mesh for each frame to obtain an intermediate mesh animation.

2. The motion retargeting method of a motion retargeting apparatus for character animation of claim 1, wherein the source motion is a skeletal motion, a mesh animation, 3D marker data, or a combination of at least one of the skeletal motion, the mesh animation and the 3D marker data.

3. The motion retargeting method of a motion retargeting apparatus for character animation of claim 1, wherein the generating the intermediate object comprises:
    generating an intermediate skeleton having the same proportion and structure as the target character, and retargeting the skeletal motion of the source motion to the intermediate skeleton to obtain a skeletal motion of the intermediate object.

4. The motion retargeting method of a motion retargeting apparatus for character animation of claim 1, wherein the extracting the keyframes comprises:
    measuring multiscale motion saliency of the intermediate object, and selecting only frames with the multiscale motion saliency that is equal to or higher than a preset value as the keyframes.

5. The motion retargeting method of a motion retargeting apparatus for character animation of claim 4, wherein the estimating comprises:
    optimizing the skeletal rig parameters and the deformation rig parameters through an energy functional equation of $$\text{min } E(\overline{M}^I, \overline{M}^c) = \sum_{t=1}^{N_k} E(p^I(t), p(c(t)))\text{''},$$

in which the $E(p^I(t), p(c(t)))$ is calculated according to the equation of $$\text{''}E_p(p^I \cdot p(c)) + \lambda_{sp} E_{sp}(c) + \lambda_{ac} E_{ac}(c)\text{''},$$

the $\overline{M}^I$ is the intermediate object, the $\overline{M}^C$ is the target character, the $p^I(t)$ and $p^I$ is the pose of the intermediate object, the $p(c(t))$ and $p(c)$ are the target character pose, the $c(t)$ is the rig space parameters, the $E(p^I, p(c))$ is pose difference energy between the intermediate object pose and the target character, the $E_{sp}$ is sparse regularization energy, the $E_{ac}$ is temporal smoothness, the $\lambda_{sp}$ is a weight of the $E_{sp}$, and the $\lambda_{ac}$ is a weight of the $E_{ac}$.

6. The motion retargeting method of a motion retargeting apparatus for character animation of claim 1, wherein the minimizing the error between the intermediate object and the target character comprises:
    constituting target rig parameters through skeletal rig parameters and deformation rig parameters, and determining a pose of the target character based on the target rig parameters; and
    estimating optimal skeletal rig parameters to minimize a skeleton error between the intermediate object and the target character, and estimating optimal deformation rig parameters using the estimated skeletal rig parameters to minimize a mesh error between the intermediate object and the target character.

7. A motion retargeting apparatus for character animation comprising:
    an intermediate object generation unit configured to generate an intermediate object including at least one of a skeleton and a mesh based on a source motion and a target character;
    a keyframe extraction unit configured to extract keyframes of the intermediate object; and
    a target rig parameter optimization unit configured to constitute target rig parameters based on the extracted keyframes, and perform spacetime optimization on the target rig parameters to minimize a pose error between the intermediate object and the target character,
    wherein when a plurality of corresponding points between the source motion and the target character are selected by a user, the intermediate object generation unit generates a source mesh structure based on the corresponding points of the source motion, generates an intermediate mesh that has the same structure as the source mesh structure and is formed with the corresponding points of the target character, and then transfers deformation gradients from the source mesh structure to the intermediate mesh for each frame to obtain an intermediate mesh animation.

8. The motion retargeting apparatus for character animation of claim 7, wherein the source motion is a skeletal motion, a mesh animation, 3D marker data, or a combination of at least one of the skeletal motion, the mesh animation and the 3D marker data.

\* \* \* \* \*